Figure 1:

Sept. 13, 1960   J. E. HUGHES ET AL   2,952,708
EXPLOSIVE
Filed Sept. 5, 1958

INVENTORS
JESSE EDWARD HUGHES
DONALD NIXON THATCHER
BY
ATTORNEY

United States Patent Office 2,952,708
Patented Sept. 13, 1960

2,952,708

EXPLOSIVE

Jesse Edward Hughes, Bridgeport, and Donald Nixon Thatcher, Sewell, N.J., assignors to E. I. du Pont de Nemours and Company, Wilmington, Del., a corporation of Delaware Filed Sept. 5, 1958, Ser. No. 759,246

7 Claims. (Cl. 260—607)

The present invention relates to a novel composition of matter and a method for its preparation. More particularly, the present invention relates to a novel dipicryl sulfone having improved properties and to a novel method for its preparation.

German Patent 269,826, issued in 1912, described a novel explosive compound termed "hexanitrosulfobenzide" as having a peroxide structure. The disclosure teaches that the compound was prepared "by treatment of a suspension of hexanitrodiphenyl sulfide (dipicryl sulfide) in nitric acid with oxidizing agents which split off oxygen in the presence of this acid." The decomposition temperature of the "hexanitrosulfobenzide" was given as 250–255° C.

In 1916, Stettbacher (Z. ges. Schiess- u. Sprengstoffw. 11, 115) questioned the structure assigned in the patent to the compound on the basis of the high stability of the compound. Later experimenters (Duin and van Lennep, Rec. trav. chim. 39, 145–177 (1920)) concurred with Stettbacher and assigned the structure:

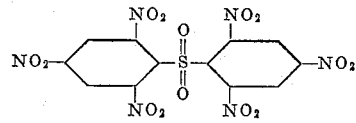

to the compound, the compound now being recognized generally as a sulfone rather than a peroxide. This hexanitrodiphenyl sulfone, or more commonly dipicryl sulfone, was prepared by Duin and van Lennep by the oxidation of dipicryl sulfide suspended in nitric acid (density 1.49, concentration about 95%) by chromic acid at room temperature. The reaction time was 15 days, and the dipicryl sulfone after recrystallization from alcoholic acetone had a melting point (corrected) of 307° C. The experimenters state that because of the long reaction time required, they attempted to speed-up the reaction by heating. However, the heating was not effective.

In many applications involving detonating explosives, thermal stability is of considerable importance. The reported high melting point of dipicryl sulfone made this compound an obvious candidate despite the commercially unfeasible preparative time. When the prior art methods were essentially duplicated, dipicryl sulfone melting with decomposition at 338–345° C. was obtained in the form of needle-like orthorhombic crystals having a relatively low bulk density. This material was not free flowing. The low bulk density, the poor flow characteristics, and the prolonged reaction period required for its manufacture made dipicryl sulfone thus prepared unattractive for most commercial explosive applications.

Accordingly, an object of the present invention is the provision of free-flowing dipicryl sulfone which has the high melting point of the prior art material but higher bulk density. Another object of the present invention is the provision of a method for the manufacture of dipicryl sulfone having improved properties, which method is easily and rapidly effected. Other objects will become apparent as the invention is further described.

We have found that a second crystal form of dipicryl sulfone can be prepared and that dipicryl sulfone having this crystal form is free-flowing and has high bulk density and high melting point. The crystals of this novel dipicryl sulfone are monoclinic crystals having the unit cell dimensions: $A_0$, 10.75; $B_0$, 17.75; and $C_0$, 9.58, the beta angle of the crystals being 105.5°, the space group being $C_{2h}^5$, the unit cell of the crystals consisting of four molecules.

The aforedescribed novel dipicryl sulfone is obtained by heating at a temperature of at least 70° C. a suspension of dipicryl sulfone in nitric acid having a concentration greater than 88% and thereafter separating undissolved dipicryl sulfone from the nitric acid medium at a temperature of at least 40° C. In accordance with the method of the present invention, the dipicryl sulfone may be formed in situ in the hot concentrated acid by the oxidation of dipicryl sulfide by chromium trioxide or sodium or potassium dichromate.

The following examples serve to illustrate specific embodiments and features of the present invention. However, they will be understood to be illustrative only and not as limiting the invention in any manner. Unless otherwise specified, the parts in the examples are parts by weight.

EXAMPLE 1

In accordance with the teachings of the prior art, a quantity of dipicryl sulfone was prepared by the oxidation of 17 parts of dipicryl sulfide by 6.5 parts of chromium trioxide in 149 parts of 95% nitric acid at room temperature. The reaction was completed in seven days, and thereafter the reaction mixture was quenched with twice its volume of water and then filtered. The crystals obtained were needle-like in shape and were washed with hot water to remove nitric acid and adherent chromium salts. The preparative procedure was repeated several times to obtain sufficient needle-like crystals of the sulfone for further studies.

A portion of the crystals obtained was photographed under 50 times magnification, the photograph being shown in Figure 1. Another portion was subjected to X-ray diffraction analysis for determination of crystal structure. The results of the analysis are given in the following table:

*Table I*

Unit cell dimensions:
  $A_0$: 9.37
  $B_0$: 19.08
  $C_0$: 19.70
Space group: $D_{2h}^9$
Crystal class: orthorhombic
No. of molecules per unit cell: 8
Theoretical density (g./cc.): 1.84

Another portion of the crystals was tested for physical and explosive properties, the results of these tests being summarized in Table II.

*Table II*

Melting point (° C.): 338–345, with decompn.
Bulk density (g./cc.): 0.86
Velocity of detonation [1] (m./sec.): 4760
Sand crushing: 79% of that by PETN
Thermal stability: 3.5 hrs. at 450° F.
Min. firing current: [2] fires loose with CD–30 or CD–45 blasting machine

[1] Velocity detd. on a 1.2-grain-per-foot train of the material confined in a metal sheath.
[2] CD–30 supplies 27 joules of energy and CD–45 supplies 138 joules, the latter condenser-discharge blasting machine supplies firing energy of the highest magnitude customarily employed.

Attempts to load the material into cap shells were complicated by the resistance of the material to free flow, that is, the needles of the material bridged during the loading operation.

EXAMPLE 2

Figure 2:
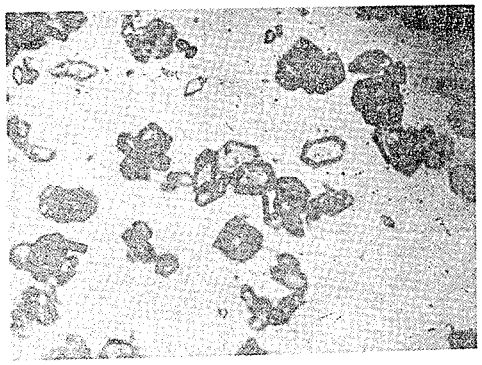

Into a glass-lined reactor provided with means for heating and refluxing and containing 149 parts of 95% nitric acid was introduced 34 parts of the orthorhombic dipicryl sulfone prepared in accordance with Example 1. The mixture was refluxed for 30 minutes, the reflux temperature being about 85° C. Then, 15 parts of water was added to the mixture at reflux temperature. The resultant mixture was cooled to about 45° C. and filtered. The solid was washed with hot water to remove nitric acid and then dried. Microscopic (50×magnification) examination of the crystals showed dipyramidal crystals, shown in the photograph of Figure 2.

EXAMPLE 3

Into a glass-lined reactor provided with means for heating and for refluxing were charged 34 parts (0.075 mole) of dipicryl sulfide, 12 parts (0.12 mole) of chromium trioxide, and 149 parts of 95% nitric acid. The mixture was heated to reflux temperature, during which heating period the sulfide and the trioxide dissolved. The solution was refluxed for one-half hour, the dipicryl sulfone substantially precipitating as formed to give a suspension. After this time, 15 parts of water was added to the suspension at reflux temperature, and the suspension was cooled to 40° C. and then filtered. The solid sulfone was washed well with hot water to remove acid and chromium compounds and then dried. The dipicryl sulfone was obtained in amount of about 36 parts, an essentially quantitative yield, and was a straw-colored material melting, with decomposition, at 335–345° C. The crystals obtained were of the dipyramid form shown in Figure 2 and had a bulk density of 1.1 gram per cubic centimeter.

EXAMPLE 4

The procedure of Example 3 was repeated with the exception that the following quantities of reactants and solvent were used: dipicryl sulfide, 1700 parts (3.7 moles); chromium trioxide, 600 parts (6 moles) and 95% nitric acid, 8200 parts, in order to provide sufficient material for further studies. About 830 parts of water was added to the suspension after completion of the reaction. The dipicryl sulfone again was obtained in essentially quantitative yield and in the form of the dipyramid crystals of Examples 2 and 3.

Those crystals were subjected to X-ray diffraction analysis, the results being shown in Table III, along with the analysis of the needle-like crystals given for ease of comparison.

Table III

| | Prior Art Dipicryl Sulfone | Novel Dipicryl Sulfone [1] |
|---|---|---|
| Unit Cell Dimensions: | | |
| $A_0$ | 9.37 | 10.75. |
| $B_0$ | 19.08 | 17.75. |
| $C_0$ | 19.70 | 9.58. |
| Space Group | $D_{2h}^9$ | $C_{2h}^5$. |
| Crystal Class | orthorhombic | monoclinic. |
| Formula Weights per Unit Cell [2] | 8 | 4. |
| Theoretical d. (g./cc.) | 1.84 | 1.841. |

[1] Beta angle—105.5°.
[2] No. of molecules per unit cell.

Another portion of the monoclinic dipicryl sulfone was tested for physical and explosive properties, the test results being shown in Table IV. Again, the properties of the trothorhombic form are given for ease of comparison.

Table IV

| | Prior Art Dipicryl Sulfone | Novel Dipicryl Sulfone |
|---|---|---|
| Melting point, (°C.) | [1] 338–345 | [1] 335–345. |
| Bulk density (g./cc.) | 0.86 | 1.1. |
| Velocity of detonation [2] (m./sec.) | 4760 | 5210. |
| Sand crushing | 79% of that by PETN. | 88% of that by PETN. |
| Thermal stability | 3.5 hrs. at 450° F. | 7.5 hrs. at 450 °F. |
| Min. firing current | fire loose with CD-30 or CD-45 blasting machines | does not fire loose with CD-30 or CD-45 blasting machine. |

[1] Melts with decomposition.
[2] Velocity detd. on a 1.2 grain-per-foot train of the material confined in a metal sheath.

The monoclinic crystals of the novel dipicryl sulfone were free-flowing, having no tendency to bridge as the material was loaded into cap shells.

EXAMPLE 5

Thirty-four parts of the monoclinic dipicryl sulfone was suspended in 149 parts of 95% nitric acid. The suspension was refluxed for ½ hour and then allowed to cool to 30° C. The product isolated by filtration was in the form of the needle-like orthorhombic crystals. These orthorhombic crystals were suspended in the acid originally used, and the suspension was refluxed for ½ hour, diluted with 45 parts of water, and filtered while hot, i.e. at about 40–50° C. Essentially all the monoclinic dipicryl sulfone originally charged to the acid was recovered, once more in the form of the monoclinic crystals.

EXAMPLE 6

A solution of 34 parts of dipicryl sulfide and 11 parts of chromium trioxide in 149 parts of 95% nitric acid was refluxed for one-half hour, and the resultant suspension was cooled to room temperature. At approximately 38° C., a phase transformation apparently occurred, the suspension turning almost semisolid in the reactor. The product was isolated from the semisolid mass by filtration, was washed with hot water, and dried. The dried product was in the form of needle-like crystals melting at 340° C. Microscopic examination showed that the needle-like orthorhombic crystals were the only crystal form present.

These needle crystals were suspended in 149 parts of 95% nitric acid, and the suspension was refluxed for 45 minutes. The suspension was diluted with 45 parts of water, cooled to about 40° C. and filtered. The washed, dried solid product melted at 340–345° C. The monoclinic dipicryl sulfone crystals were the only crystal form detectable.

EXAMPLE 7

Thirty-four parts of dipicryl sulfide was charged to a glass-lined reactor containing 149 parts of 95% nitric acid. The mixture was stirred and heated to 50° C., the dipicryl sulfide dissolving. Then, 13 parts of chromium trioxide was added; when the addition was complete the solution was brought to reflux temperature. After the solution was refluxed for 1½ hours, the major portion of the dipicryl sulfone precipitating as formed, 45 parts of water was added at reflux temperature. The suspension was allowed to cool to about 45° C. and filtered. The crystals obtained were washed with hot water and dried. The product, which was straw-colored, melted, with decomposition, at 340° C., and was in the form of the monoclinic crystals, was obtained in substantially quantitative yield.

EXAMPLE 8

Eleven parts of chromium trioxide and 37 parts of nitric acid (95%) were heated to reflux in a glass flask. Then, 34 parts of dipicryl sulfide dissolved in 149 parts of 95% nitric acid was introduced into the flask over a ¾-hour period, the reaction mixture being maintained at reflux temperature. After an additional ½ hour of refluxing, the mixture was diluted with 30 parts of water, cooled to about 40° C., and filtered. The product crystals were washed with hot water and dried. An essentially quantitative yield of the monoclinic dipicryl sulfone was obtained.

EXAMPLE 9

A solution of 34 parts of dipicryl sulfide and 5 parts of chromium trioxide in 149 parts of 95% nitric acid was refluxed for ¾ hour. Then, 45 parts of water was added to the resultant suspension at reflux temperature. The diluted suspension was filtered hot (about 45° C.), and a bright yellow solid consisting of monoclinic dipicryl sulfone admixed with unreacted dipicryl sulfide was obtained. The yellow solid and 6 parts of chromium trioxide were added to 149 parts of 95% nitric acid, the mixture was refluxed for ¾ hour, and the suspension was diluted with 45 parts of water at reflux temperature. Filtration of the suspension at a temperature of about 45° C. gave a straw-colored product consisting entirely of monoclinic dipicryl sulfone (quantitative yield) melting at 345° C. with decomposition.

EXAMPLE 10

Dipicryl sulfide (34 parts) and 11 parts of chromium trioxide were introduced into a reactor containing 149 parts of nitric acid (95%). The mixture was heated to 70° C., the reactants dissolving in the acid during the heating period. The solution was maintained at about 70° C. and stirred for two hours, the dipicryl sulfone formed precipitating during the reaction period. After completion of the reaction, 15 parts of water was added to the suspension, which was then cooled to 40° C. and filtered. The washed and dried solid consisted of dipicryl sulfone of monoclinic crystal form, the material being obtained in quantitative yield.

EXAMPLE 11

A solution of 34 parts dipicryl sulfide and 11 parts of chromium trioxide in 149 parts of 95% nitric acid was refluxed for ½ hour, after which the hot suspension was filtered to remove suspended solids. The filtrate was recycled to the reactor, sufficient make-up nitric acid (95%) being added to bring the filtrate to 149 parts. To the reactor containing the filtrate was added 34 parts of the sulfide and 11 parts of the trioxide, the mixture was refluxed for ½ hour, and then the separation of solids from the hot suspension was effected. The recycle and reaction procedure was repeated once more. The material obtained from the three cycles was composited, washed, and dried. The composited dipicryl sulfone, which was obtained in the form of straw-colored monoclinic crystals, melted at 340–345° C. with decomposition.

EXAMPLE 12

Thirty-four parts of dipicryl sulfide was dissolved in 149 parts of 95% nitric acid. Then, 18 parts of pulverized, hydrated sodium dichromate was added to the solution which thereafter was brought to reflux (temperature, 86° C.). After 45 minutes of refluxing, the suspension was diluted with 15 parts of water, cooled to 40° C., and filtered. The solid, monoclinic dipicryl sulfone, was washed and dried.

EXAMPLE 13

The procedure of Example 12 was repeated with the exception that potassium dichromate was substituted for the sodium dichromate. Again, the monoclinic crystal form of dipicryl sulfone was obtained.

As seen by reference to the examples, particularly Examples 1–4, novel dipicryl sulfone crystals may be obtained which exhibit properties highly improved over those of the conventional dipicryl sulfone. Although the crystals of the novel material of the present invention exhibit the same high melting point which makes the conventional material attractive for use in high-temperature applications of explosives, the novel material, in contrast to the conventional compound, is characterized by properties which make its use in explosive applications commercially feasible.

For example, the needle-like form of the prior art material tends to produce deleterious bridging of the material when it is being loaded, e.g. into blasting cap shells. In contrast, the crystals of the novel material of the present invention are free flowing and are loaded readily. Moreover, the dipyramid crystals of the novel dipicryl sulfone provide a bulk density higher than that of the needle-like form of the compound. As pointed out previously, high bulk density is desirable and, indeed, practically essential in explosives applications because a greater amount of explosive by weight can be loaded into a given volume. Moreover, in addition to overcoming these deficiencies of the prior art dipicryl sulfone, the novel compound is advantageous over the former material in that its explosive strength is greater and its velocity of detonation is higher. The increased thermal stability of the novel compound, i.e. 7.5 hours versus 3.5 hours at 450° C., also is of considerable importance, as is its activity with respect to electrical impulses. As indicated by the minimum firing current tests, the dipicryl sulfone of the present invention, unlike conventional dipicryl sulfone, is not an initiating explosive, that is, it cannot be fired loose by the imposition of firing current of the highest magnitude customarily employed, that imposed by a CD–45 blasting machine capable of providing 138 joules of energy. Therefore, unlike the prior art material, novel dipicryl sulfone is not susceptible to accidental firing due to stray electricity, such as static or the electricity generated by power sources, e.g. generators, in the area of utilization. This high degree of safety, inherent to the novel material, in the presence of stray electricity further enhances its use in explosives applications.

We have found that the novel dipicryl sulfone having monoclinic crystals as afore-defined is prepared by crystal transformation under controlled conditions, a finding which is surprising in itself and especially so when the distinctive and highly improved properties of the resulting dipicryl sulfone crystals are taken into consideration.

This crystal transformation is effected by heating at a temperature of at least 70° C. dipicryl sulfone, either the needle-like crystals of the material formed in accordance with the procedures of the prior art or dipicryl sulfone formed in situ, in nitric acid having a concentration of at least 88% and thereafter removing undissolved dipicryl sulfone at a temperature above the crystal transition temperature. As evidenced by the experiment reported in Example 6, the transition temperature appears to be about 38° C. Therefore, to insure the obtaining of the desired crystal form, we prefer to separate the solid dipicryl sulfone from the nitric acid at a temperature of at least 40° C., the undesired orthorhombic crystals being formed in toto at lower temperatures, for example 30° C.

As afore-mentioned, in order to obtain the monoclinic crystals, concentrated nitric acid must be used as the solvent. To achieve the crystal transformation, at least a limited amount of the dipicryl sulfone must go into solution. We have found that the critical concentration of the nitric acid is 88%; at and below this concentration the dipicryl sulfone is essentially insoluble. Therefore, the use of nitric acid of concentration greater than 88%, preferably greater than 90%, is essential to the instant process. Moreover, the use of nitric acid of this concentration is also essential to that embodiment of the process in which the sulfone is formed in situ, the dipicryl sulfide and the oxidant not dissolving sufficiently in acid of lower concentration for the carrying out of the process. The upper limit on the concentration of the nitric acid is governed solely by economic considerations. Although fuming nitric acid is usable in the process, generally the less expensive grades of the acid, i.e. those of concentration of about 90–95% will be employed. However, inasmuch as the solubility of the sulfone and of the reactants used to form the sulfone in situ is directly related to the acid concentration, increases in concentration increasing the solubilities, it may be desirable at times to use a lesser volume of the more highly concentrated fuming nitric acid. Of course, this consideration is immaterial when the sulfone is added to the nitric acid, because so little sulfone must dissolve to obtain the transition to monoclinic crystals. This consideration actually is of value only when the sulfone is formed in situ, in which case the reactants must dissolve essentially completely. Naturally, since the nitric acid in this process acts solely as a solvent and does not engage per se in any chemical reaction, the amount used is only critical in that sufficient acid must be present to form the suspension of dipicryl sulfone or to dissolve the reactants when the sulfone is so prepared.

Solubility characteristics and reaction rate govern the temperature at which the process is effected. The temperature of the medium influences the solubilities of the dipicryl sulfone and also the reactants which are used to form the dipicryl sulfone in situ. Below 70° C., the solubilities are too limited for efficient operation. Moreover, the reaction rate increases with temperature. Therefore, the use of a temperature of at least 70° C. is a critical feature of the instant process. We have found that more facile operation is possible when reflux temperature is used, because the refluxing procedure results in automatic temperature control and, thus, no auxiliary facilities are required to control the temperature. In fact, the medium exhibits a tendency to go to reflux when it is heated to about 50–60° C. and maintaining it at temperatures less than reflux temperature requires the employment of cooling means. Therefore, the use of reflux temperature in the instant process constitutes a preferred embodiment of the present invention. The temperature at which refluxing occurs of course is dependent upon the concentration of the acid. For example, when 95% nitric acid is used, the medium refluxes at a temperature of about 80–86° C. Pressure per se has no effect on the results of the process, and because of the ease inherent to operation at atmospheric pressure and the simplified equipment necessary for operation at this pressure, in all probability this pressure will be generally employed.

The dipicryl sulfone, which is soluble only to a limited extent in the reaction medium, remains essentially suspended in the medium or precipitates out of the medium as it is formed to give a suspension and can be separated from the cooled suspension by a simple filtration step or by decanting or centrifugation. However, we have found it desirable after completion of the heating period to add to the suspension at reflux temperature a small quantity of water, i.e. that amount sufficient to dilute the acid to below the critical concentration, 88%. In this way, by bringing the concentration of the acid to 88% or below, any minor quantities of the dipicryl sulfone which may be dissolved in the more concentrated acid are brought out of solution, to insure complete recovery of all dipicryl sulfone formed, the compound being essentially completely insoluble in acid of 88% concentration or less.

After the sulfone has been separated from the suspension, it is washed with hot water, which removes the residual nitric acid and, if present, adherent chromium compounds, and then is dried. Further purification, for example, recrystallization, generally is unnecessary.

As has been shown, the novel dipicryl sulfone of improved properties is readily obtained either when dipicryl sulfone of the prior art orthorhombic form is added to the nitric acid milieu or when dipicryl sulfone is formed in situ in the milieu. In view of the prolonged reaction periods, days and weeks, involved in the formation of the prior art material, the formation of the material in situ, in at most a few hours, will be the preferred method for effecting on a commercial basis the instant process. The commercial advantages, from the points of view of economics, process and equipment simplification, and general technology, etc., of such greatly shortened preparative periods are obvious and lend additional weight to the industrial utilization of the improved dipicryl sulfone.

The industrial advantages of the in situ process are emphasized by the fact that the novel improved compound is prepared readily in substantially quantitative yield by treatment of the dipicryl sulfide with the oxidant in concentrated nitric acid. Suitable oxidants include chromium trioxide ($CrO_3$), also known in the art as "chromic acid" and "chromic anhydride," sodium dichromate, and potassium dichromate. Obviously, the reactants should be present in essentially stoichiometric amounts to obtain a quantitative yield in one pass, the use of less than the stoichiometric amount of either reactant resulting in a corresponding decrease in yield based on the other reactant, as indicated in Example 9. However, as also illustrated in Example 9, the product mass containing a quantity of unreacted material, may be recycled readily to a reaction zone containing the necessary quantity of the other reactant to give an over-all quantitative yield, excess oxidant having no deleterious influence on the reaction.

A recycle procedure was shown in Example 11. When such recycling is employed, for example in a continuous process, the separation of undissolved dipicryl sulfone from the acid without water dilution is preferred, because such operation obviates any need to butt the acid up to the required concentration. The minor quantities of dissolved dipicryl sulfone which are recycled have no deleterious effects and may be recovered if desired after the last cycle of the series by the water dilution technique.

The reaction time is not critical. The reaction is permitted to go to completion, which generally occurs in at most a few hours. The total time required for the reaction, of course, is dependent to some extent upon such factors as the total quantity of reactants and solvent, the efficiency of the heating means used to bring the reaction components to reflux, and the equipment used. These same principles govern the operating time used when the dipicryl sulfone is added to the nitric acid rather than formed in the nitric acid. As shown, the crystal transition from the needle-like orthorhombic crystals to the dipyramidal monoclinic crystals occurs in a very brief period of time.

Although the process of the present invention has been illustrated as a batchwise process, equally feasible is the carrying out of the process in a continuous cyclic manner. For example, the dipicryl sulfone or the reactants in the solvent may be introduced continuously into an operation zone maintained at the elevated temperature, while the suspension of monoclinic crystals is continuously removed from the zone, the nitric acid, dissolved dipicryl sulfone, and any excess reactants being recycled after product separation.

The invention has been described in detail in the foregoing discussion, in which the improved properties of the novel material have been fully demonstrated and complete details have been supplied on the method of obtaining the improved material. However, it will be apparent to those skilled in the art that many variations are possible without departure from the scope of the present invention. We intend, therefore, to be limited only by the following claims.

We claim:
1. Dipicryl sulfone in the form of monoclinic crystals.
2. A process for obtaining dipicryl sulfone in the form of monoclinic crystals which comprises heating a suspension of dipicryl sulfone in nitric acid having a concentration above 88% at a temperature of from 70° C. to the boiling temperature of the said suspension and thereafter separating undissolved dipicryl sulfone from the nitric acid medium at a temperature of from 40° C. to the boiling temperature of the said medium.

3. A process according to claim 2, wherein water in amount sufficient to decrease the concentration of the nitric acid to below 88% is added to said suspension prior to the separation of said undissolved dipicryl sulfone.

4. A process according to claim 2, wherein said nitric acid is recycled after separation of said undissolved dipicryl sulfone.

5. A process according to claim 2, wherein said dipicryl sulfone is formed in situ by treatment of dipicryl sulfide with an oxidant selected from the group consisting of chromium trioxide, sodium dichromate, and potassium dichromate.

6. Process according to claim 5, wherein said oxidant is present in at least stoichiometric amount.

7. A process for the obtaining of dipicryl sulfone in the form of monoclinic crystals which comprises refluxing a suspension of dipicryl sulfone in nitric acid having a concentration of at least 88% and thereafter separating undissolved dipicryl sulfone from the nitric acid medium at a temperature of at least 40° C.

References Cited in the file of this patent

Van Duin et al.: Rec. Trav. Chem. 39, 157–160 (1920).